United States Patent
Khasin et al.

(10) Patent No.: US 7,996,403 B2
(45) Date of Patent: Aug. 9, 2011

(54) METHOD AND APPARATUS FOR ASSIGNING A CULTURAL CLASSIFICATION TO A NAME USING COUNTRY-OF-ASSOCIATION INFORMATION

(75) Inventors: Anna Khasin, Herndon, VA (US); Frankie Elizabeth Patman Maguire, Washington, DC (US); Leonard Arthur Shaefer, Jr., Leesburg, VA (US); Stephen John Watjen, Ashburn, VA (US); Charles Kinston Williams, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/863,028

(22) Filed: Sep. 27, 2007

(65) Prior Publication Data

US 2009/0089283 A1  Apr. 2, 2009

(51) Int. Cl.
*G06F 7/00* (2006.01)
(52) U.S. Cl. ........ 707/737; 707/748; 707/754; 707/769; 707/776
(58) Field of Classification Search .......... None
See application file for complete search history.

(56) References Cited

U.S. PATENT DOCUMENTS

| | | | | |
|---|---|---|---|---|
| 5,377,280 A | * | 12/1994 | Nakayama | 382/229 |
| 5,485,373 A | * | 1/1996 | Davis et al. | 715/205 |
| 7,039,172 B2 | | 5/2006 | Wrobel | |
| 2002/0083029 A1 | | 6/2002 | Chun et al. | |
| 2004/0002850 A1 | * | 1/2004 | Shaefer et al. | 704/5 |
| 2004/0024760 A1 | | 2/2004 | Toner et al. | |
| 2005/0084152 A1 | | 4/2005 | McPeake et al. | |
| 2005/0273468 A1 | * | 12/2005 | Hermansen et al. | 707/100 |
| 2006/0031239 A1 | * | 2/2006 | Koenig | 707/100 |
| 2007/0005567 A1 | | 1/2007 | Hermansen et al. | |

OTHER PUBLICATIONS

Author: Douglas A. Galbi; Title: Long-Term Trends in Personal Given Name Frequencies in the UK; Date: Jul. 20, 2002; Publisher: Social Science Research Network (www.ssm.com); Pertinent pp. 1-16.*

Author: Raju Balakrish; Title: Country Wise classification of Human Names; Date: Feb. 2006; Publisher: Proceedings of the 5th WSEAS Int. Conf. on Artificial Intelligence; Pertinent Pages: entire attached pdf file (7 pages).*

* cited by examiner

*Primary Examiner* — Tim T. Vo
*Assistant Examiner* — Anh Tai V Tran
(74) *Attorney, Agent, or Firm* — Patterson & Sheridan, LLP

(57) ABSTRACT

A method and system for performing a search request for a name among a database including a plurality of names. In one implementation, the method includes receiving the search request on the name, determining a geographic location associated with the name, assigning a cultural classification to the name based on the geographic location associated with the name, and completing the search request by searching for the name among the plurality of names within the database based on the cultural classification assigned to the name.

20 Claims, 3 Drawing Sheets

100 # METHOD AND APPARATUS FOR ASSIGNING A CULTURAL CLASSIFICATION TO A NAME USING COUNTRY-OF-ASSOCIATION INFORMATION

FIELD OF THE INVENTION

The present invention relates generally to data processing, and more particularly to techniques for assigning a cultural classification to data (e.g., personal names).

BACKGROUND OF THE INVENTION

An optimized personal name search system typically requires that search algorithms be sensitive to the cultural provenance of personal names (also referred to herein generally as "names"). For example, knowing that a name is Hispanic is important for understanding that "Juan Carlos Morales" is a better match for "Juan Carlos Morales Cabrera" than for "Juan Carlos Cabrera Morales". Also, knowing that "Alexander Sergeyev" is a likely Russian name would allow a search algorithm to match the name to "Sasha Sergeyev", since Sasha is a common nickname for Alexander in Russian-speaking countries. Maximizing the accuracy of a name search system that culturally classifies names, therefore, has a positive impact on the ability of the name search system to return relevant matches. There are also other situations in which cultural identification of a name is important for achieving a desired outcome, such as minimizing advertising costs by targeting language-specific collateral (or items) to likely speakers of those languages.

BRIEF SUMMARY OF THE INVENTION

In general, this specification describes a method and system for performing a search request for a name among a database including a plurality of names. In one implementation, the method includes receiving the search request on the name, determining a geographic location associated with the name, assigning a cultural classification to the name based on the geographic location associated with the name, and completing the search request by searching for the name among the plurality of names within the database based on the cultural classification assigned to the name.

Implementations can include one or more of the following features. Determining a geographic location associated with the name can include approximating an actual frequency distribution of the name within a country. Approximating an actual frequency distribution of the name within a country can include determining a first number that represents a number of times the name appears in the country divided by a total number of names associated with the country, and multiplying the first number by a factor that represents a population of the country to determine a count for the name within the country. Assigning a cultural classification to the name based on the geographic location associated with the name can include assigning a cultural group that includes countries having a greatest number of counts. Assigning a cultural group can include assigning a cultural group selected from the group including Anglo, Arabic, Chinese, Hispanic, French, German, Indian, Korean, Pakistani, Russian, Thai, Japanese, Vietnamese, Indonesian, Farsi, Afghan, Yoruban, European, Southwest Asian, or Han. Receiving the search request for the name can include receiving the search request through a query from a user or an application. The search request for a name can be a search request for a personal name.

Implementations may provide one or more of the following advantages. Implementations of a name classification system described herein uses country-of-association information to associate a name with a cultural classification/partition. Unlike conventional name classification systems that can only classify names as belonging to a cultural partition for which there is training data, in one implementation, the name classification system described herein implements an enhanced algorithm that can approximate data and statistics for which there is no training data. Such approximations can then be used to make a better judgment as to the cultural provenance of a name.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to techniques for assigning a cultural classification to names. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
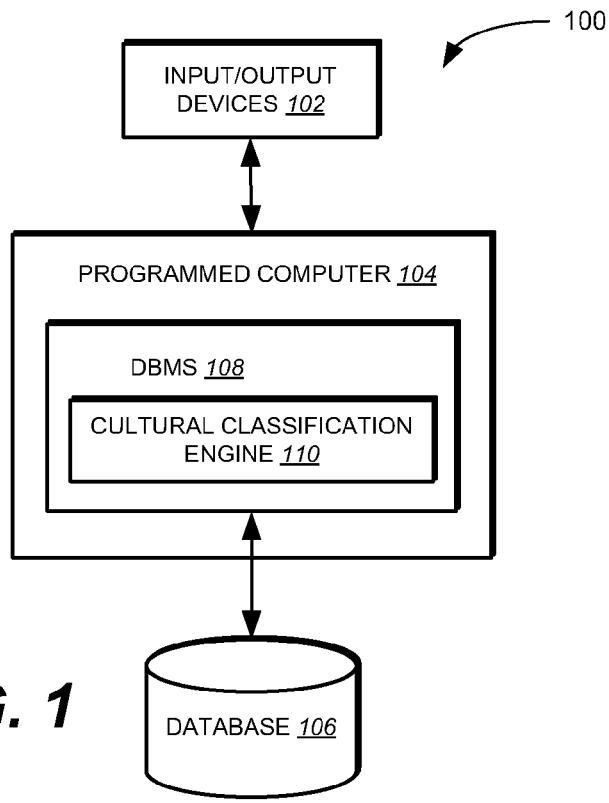
FIG. 1 is a block diagram of a data processing system including a cultural classification engine in accordance with one implementation.

FIG. 1 illustrates one implementation of a data processing system 100 including input and output devices 102, a programmed computer 104, and a database 106. The input and output devices 102 can include devices such as a printer, a keyboard, a mouse, a digitizing pen, a display, a printer, and the like. The programmed computer 104 can be any type of computer system, including for example, a workstation, a desktop computer, a laptop computer, a personal digital assistant (PDA), a cell phone, a network, and so on. In one implementation, the database 106 is coupled to a database management system (DBMS) 108 running on the programmed computer 104. The database management system 108 can be a relational database management system (e.g., DB2 available from International Business Machines Corporation of Armonk, N.Y.), and the database 106 can be a relational database.

In one implementation, the database 106 is configured to store names, and the database management system (DBMS) 108 includes a cultural classification engine 110 that is configured to identify a cultural classification of a name (e.g., in a query) prior to searching the names stored within the database 106. In one implementation, the cultural classification engine 110 assigns a cultural classification to a name using country-of-association information—e.g., the specific of countries that the name is associated with (as discussed in greater detail below). Thus, in one implementation, the cultural classification engine 110 can determine a cultural classification of a name based on one or more countries (or geographic locations) associated with the name. In one implementation, names are analyzed using name tokens within the names. In general a name can consist of a single name token or a name token with affixes, e.g., "Maria Carmen de la Torres Garcia" contains the name tokens "Maria", "Carmen", "de la Torres", and "Garcia".

Figure 2:
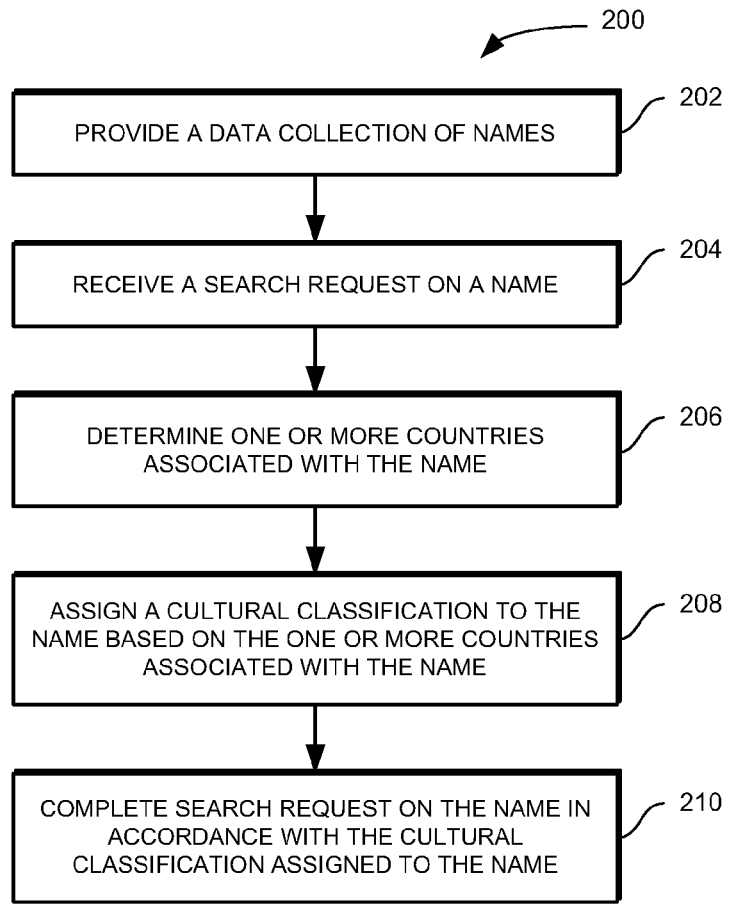
FIG. 2 illustrates a method for determining a cultural classification of a name in accordance with one implementation.

Oftentimes, how a name is stored in a database may deviate in form from the way the name is entered at the time of a query. FIG. 2 illustrates one implementation of a method 200 for determining a cultural classification of a name stored in a database (e.g., database 106) to assist in proper retrieval of names from the database. A data collection of names is provided (step 202). In one implementation, the names stored in the database are drawn from a name archive—e.g., the IBM Name Data Archive (NDA) which contains approximately 800 million names from nearly every country on earth. A search request for a name is received (e.g., by database management system (DBMS) 108) (step 204). The search request can be a query, e.g., from a user or an application. A determination of one or more countries (or geographic locations) that are associated with the name is made (e.g., by cultural classification engine 110) (step 206). In one implementation, pre-determined training data and statistical data is used to determine those countries that a name is associated with. In one implementation, the training data and statistical data comprise data from a hierarchy of different levels—e.g., country-level data (e.g., France, Spain, and so on), cultural group-level data (e.g., Arabic, Chinese, Japanese, and so on), and region-level data (e.g., Southwest Asia, European, and so on). A cultural group is assigned to the name based on the one or more countries that are associated with the name (e.g., by cultural classification engine 110) (step 208). Cultural groups that are assignable to the name include, for example, Anglo, Arabic, Chinese, Hispanic, French, German, Indian, Korean, Pakistani, Russian, Thai, Japanese, Vietnamese, Indonesian, Farsi, Afghan, Yoruban, European, Southwest Asian, or Han, among others.

The search request for the name is completed in accordance with the cultural group assigned to the name (step 208). Results of the search request can be displayed to a user on an output device such as a display. Completing a search request for a name in such a manner permits an increased precision for name processing by delivering a cultural classification for automated processing. Further, in addition to culturally classifying name in a query, the method 200 can also be used to culturally classify names within the database. In such an implementation, each possible name in a database can be examined with increased accuracy over a key-based search approach.

Figure 3:
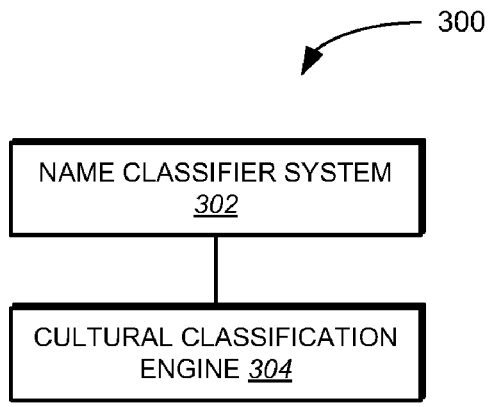
FIG. 3 is a block diagram of a data processing system including a name classifier system coupled to a cultural classification engine in accordance with one implementation.

FIG. 3 illustrates one implementation of a data processing system 300 configured to assign a cultural classification to a name. The data processing system 300 includes a name classifier system 302 and a cultural classification engine 304. In one implementation, the name classifier system 302 assigns a preliminary cultural classification to a name (e.g., using conventional techniques), and the cultural classification engine 304 is configured to apply the techniques discussed herein to corroborate, refine, or reject the preliminary cultural classification assigned to the name. The name classifier system 302 can be a name classifier system as described in co-pending U.S. patent application Ser. No. 11/281,885, which is incorporated herein by reference.

In one implementation, the cultural classification engine 304 enhances the results of the name classifier system 302 by evaluating the decision of the name classifier system 302 via the use of name occurrence statistics from countries around the world. While the archive of names from which the statistics are drawn is generally an imperfect representation of global personal name data, the cultural classification engine 304 applies a formula that can approximate the ideal occurrence numbers as if the archive of names did indeed constitute such a perfect representation. The addition of the cultural classification engine 304 to the name classifier system 302 mitigates problems caused by, e.g., incorrect classification of names, uncertain classification of names, and situations in which a name cannot be classified due to insufficient training data.

In operation, the name classifier system 302 assigns a preliminary cultural classification to a name phrase. In one implementation, a name phrase is a minimal constituent of a personal name and can consist of single name tokens or a name token with affixes (as discussed above). In one implementation, the decision logic of the cultural classification engine 304 is dependent upon both the decision of the name classifier system 302 and the means by which the name classifier system 302 made that decision. For example, if the name classifier system 302 uses dictionary-type entries to classify names of which the cultural provenance is certain, the decision of the name classifier system 302 for a name is taken with 100% confidence and the name is subjected to no further processing. If, however, the name classifier system 302 returns a decision based on a statistical analysis (or any other analysis that is less than 100% certain), the steps described below are applied by the cultural classification engine 304 to corroborate, refine, or reject the decision (or classification) of the name classifier system 302.

Figure 4:
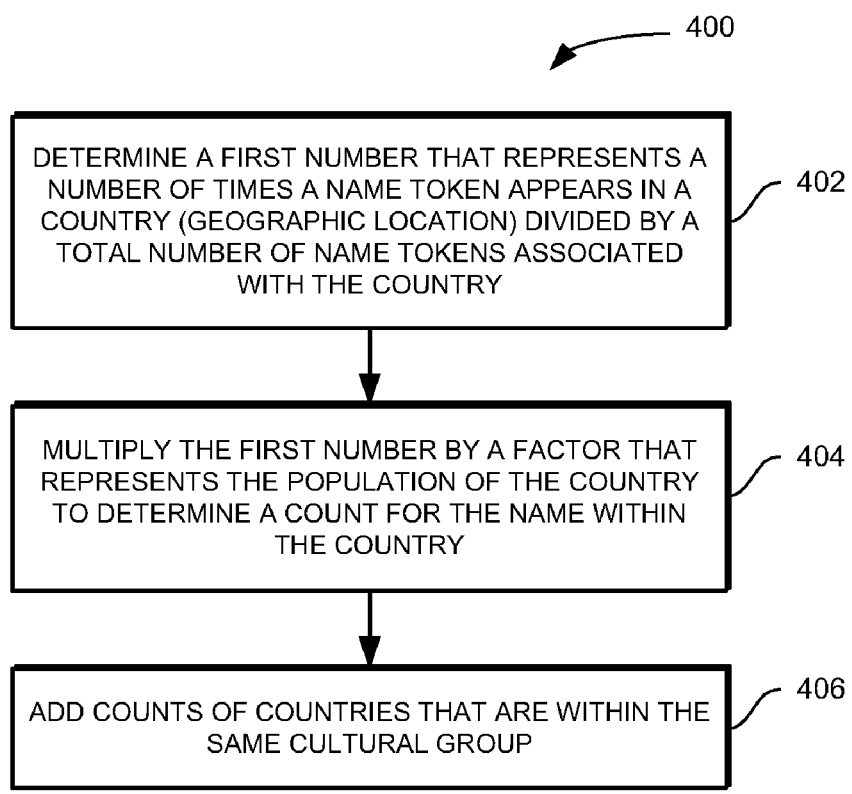
FIG. 4 illustrates a method for approximating a frequency distribution of a name in a country in accordance with one implementation.

In one implementation, country-of-association statistics are drawn from the IBM Name Data Archive (NDA). The IBM Name Data Archive (NDA) (as with other name data archives), however, does not reflect a perfect distribution of global name data, i.e., some countries are heavily represented, while others are more sparsely so. To adjust for this uneven distribution, (in one implementation) the cultural classification engine implements an algorithm (as shown in FIG. 4) to smooth name data counts by approximating what the counts for a particular name would be if the name data archive were a perfect representation of name distributions around the world. The number of times a name token has appeared in a country is divided by the total number of name phrase tokens associated with the country (step 402). This figure is then multiplied by a factor representing the population of the country (step 404). If the cultural make-up of a country belongs to one of the cultural classifications (or cultural partitions) supported by the name classifier system 302, the counts for that country are summed with counts from other countries in the same cultural partition. For example, a name like "Garcia" (seen in a number of Spanish-speaking countries) would have a high "Hispanic" association, while a name like "Niratpattanasai" (which is common only in Thailand) would have a high "Thai" association. (Note: that because the cultural classification engine 304 is being used to evaluate a decision of the name classifier system 302, country-of-association information is only relevant for confirming or rejecting the cultural partitions supported by name classifier system 302. A mapping of countries to cultural partitions of the name classifier system 302 is used to compare countryof-association information generated by the cultural classification engine 304 to the decision of the name classifier system 302.)

In one implementation, the name classifier system 302 returns one of four possible decisions when a name is not on a dictionary list and, therefore, reflects a degree of uncertainty as to its cultural provenance: (1) a single cultural category, when a name can be classified with a high degree of confidence—e.g., "Suharno" is unambiguously Indonesian; (2) multiple cultural categories, when a name can confidently be assigned to more than a single cultural category—e.g., "Martin" is both Anglo and French; (3) a cultural group, when a name belongs to several cultural categories that comprise a related cultural grouping—e.g., "Mohamed" is common in Arabic, Pakistani, Afghan, and Farsi cultures, all of which constitute a Southwest Asian cultural group; or (4) generic, when there is not enough statistical information to make a confident decision—e.g., "Hoxha" may be different enough from the names in the training data used by name classifier system 302 that the name classifier system 302 cannot render a confident decision. In one implementation, the logic employing the country-of-association information is determined by the decision returned from the name classifier system 302. In all cases, if no country-of-association information at all is available for a name, the decision returned by the name classifier system 302 is accepted by the cultural classification engine 304. In one implementation, the name classifier system 302 recognizes the following cultural groups—Southwest Asian, Han (which comprises Vietnamese, Chinese, and Korean), and European (which comprises Anglo, French, German, and Hispanic).

If the name classifier system 302 returns a single cultural classification for a name, that decision is accepted if the country-of-association information generated by the cultural classification engine 304 is consistent with the single cultural classification and is statistically significant. If more than one country-of-association is statistically significant and those countries are from the same cultural group as that assigned by the name classifier system 302, that group is returned. If the decision of the name classifier system 302 cannot be corroborated in either of these ways, the decision returned by the cultural classification engine 304 is "Generic". For example, if the name classifier system 302 returns "Hispanic" and significant country-of-association information is discovered for Peru, Argentina, and Mexico, then "Hispanic" is returned. If, however, significant country-of-association information were discovered for Spain, France, and Germany, then "European" would be returned. And if significant country-of-association information were discovered for Italy, "Generic" would be returned if Italy did not map onto any of the cultural partitions supported by the name classifier system 302. In another example, if the name classifier system 302 returns multiple cultural categories,—e.g., Indian and Indonesian—these cultures are returned if statistically significant corroborating country-of-association information is discovered. If statistically significant country-of-association information is different from the decision of the name classifier system 302, the decision of the cultural classification engine 304 using the country-of-association is returned (i.e., the decision of the cultural classification engine 304 overrides the decision of the name classifier system 302). If there is no country-of-association information that maps onto a cultural partition recognized by the name classifier system 302, then "Generic" is returned.

In general, (in one implementation) if the name classifier system 302 returns a cultural group, this cultural group is returned if statistically significant country-of-association information from at least two member countries of the cultural group is generated. If only a single country-of-association is found to be statistically significant, and that country-of-association is within the cultural group returned by the name classifier system 302, the individual culture is returned. If no country-of-association information maps onto the cultural group, and if that information is statistically significant, then the decision of the cultural classification engine 304 based on the country-of-association information is returned. Otherwise, "Generic" is returned.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
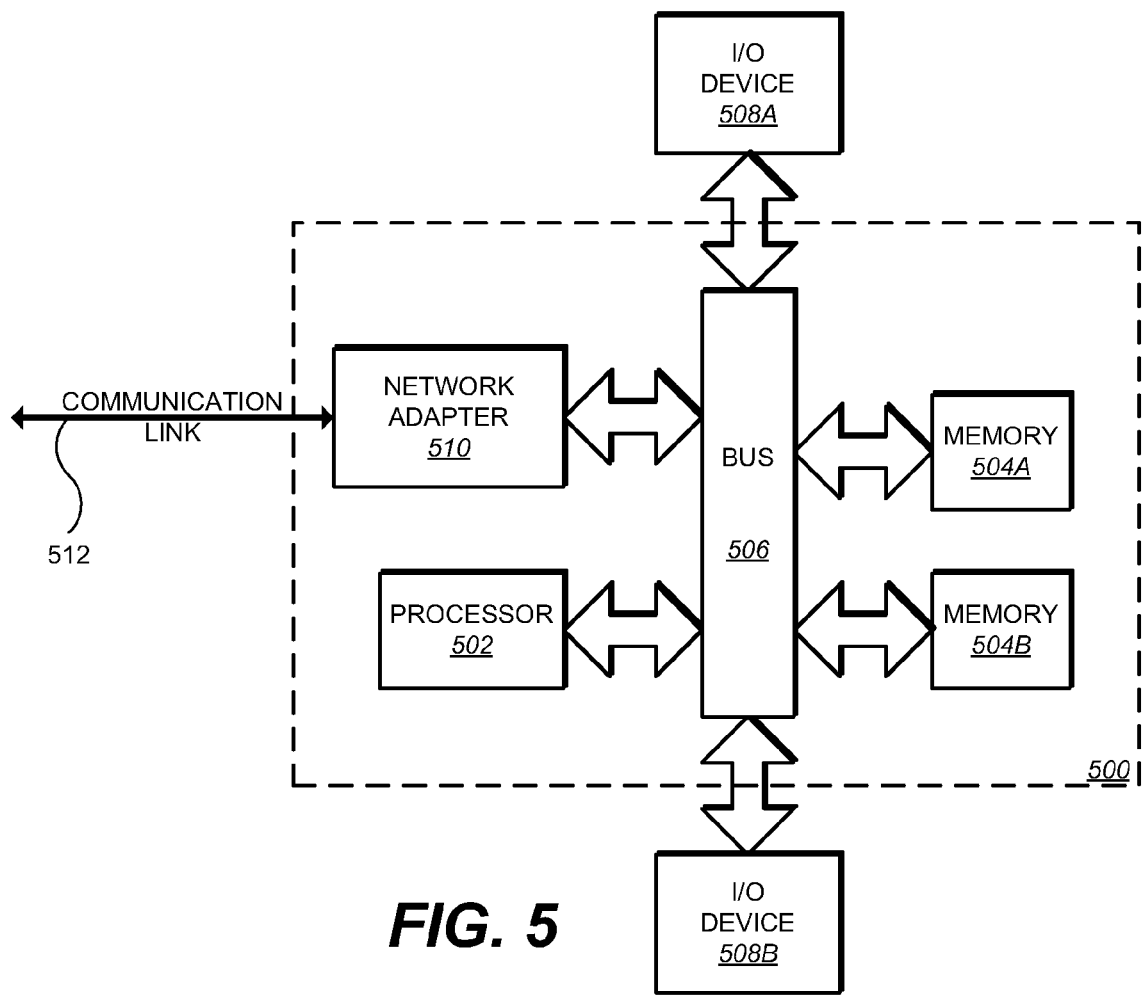
FIG. 5 is a block diagram of a data processing system suitable for storing and/or executing program code in accordance with one implementation of the invention.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Various implementations for assigning a cultural classification to names have been described. Nevertheless, various modifications may be made to the implementations. For example, though the techniques described above refer to culturally classifying personal names, the techniques are generally applicable to culturally classifying other types of names—e.g., business names and other types of data. In addition, steps of the methods described above can be performed in a different order and still achieve desirable results. Accordingly, many modifications may be made without departing from the scope of the following claims.

What is claimed is:

1. A method for performing a search request for a name among a database including a plurality of names, the method comprising:
   receiving the search request for the name;
   evaluating the name to assign a first cultural classification as a preliminary cultural classification to the name, wherein the first cultural classification is selected from a plurality of cultural classifications, each encompassing a respective plurality of cultural sub-classifications;
   determining a frequency distribution of the name for at least one country associated with at least one of the plurality of cultural sub-classifications encompassed by the preliminary cultural classification;
   by operation of one or more computer processors, evaluating the preliminary cultural classification associated with the name to assign a final cultural classification to the name, based on the determined frequency distribution of the name for the at least one country, wherein evaluating the preliminary cultural classification comprises:
      upon determining that only one cultural sub-classification of the plurality of cultural sub-classifications of the preliminary cultural classification is statistically significant, refining the preliminary cultural classification by assigning the one cultural sub-classification to the name as the final cultural classification to the name;
      upon determining that more than one cultural sub-classification of the plurality of cultural sub-classifications of the preliminary cultural classification is statistically significant, corroborating the preliminary cultural classification by assigning the preliminary cultural classification as the final cultural classification for the name; and
      upon determining that none of the plurality of cultural sub-classifications of the preliminary cultural classification are statistically significant and that more than one cultural sub-classification of a second cultural classification is statistically significant, overriding the preliminary cultural classification by assigning the second cultural classification to the name as the final cultural classification for the name; and
   completing the search request by searching for the name among the plurality of names within the database based on the final cultural classification assigned to the name.

2. The method of claim 1, wherein determining the frequency distribution of the name within a country comprises:
   determining a first number that represents a number of times the name appears in the country divided by a total number of names associated with the country; and
   multiplying the first number by a factor that represents a population of the country to determine a count for the name within the country.

3. The method of claim 1, wherein receiving the search request for the name includes receiving the search request through a query from a user or an application.

4. The method of claim 1, wherein the search request for a name is a search request for a personal name.

5. The method of claim 1, wherein evaluating the preliminary cultural classification further comprises:
   upon determining that none of the plurality of cultural sub-classifications of the preliminary cultural classification are statistically significant and that only one cultural sub-classification of the second cultural classification is statistically significant, rejecting the preliminary cultural classification to the name by assigning a generic cultural classification to the name as the final cultural classification for the name.

6. The method of claim 1, wherein evaluating the preliminary cultural classification further comprises:
   upon determining that no cultural sub-classification is statistically significant, rejecting the preliminary cultural classification by assigning a generic cultural classification to the name as the final cultural classification for the name.

7. The method of claim 1, wherein each cultural sub-classification is distinct relative to other cultural sub-classifications.

8. A computer-readable storage medium encoded with a computer program for performing a search request for a name among a database including a plurality of names, the computer program comprising computer executable instructions for:
   receiving the search request for the name;
   evaluating the name to assign a first cultural classification as a preliminary cultural classification to the name, wherein the first cultural classification is selected from a plurality of cultural classifications, each encompassing a respective a plurality of cultural sub-classifications;
   determining a frequency distribution of the name for at least one country associated with at least one of the plurality of cultural sub-classifications;
   evaluating the preliminary cultural classification associated with the name to assign a final cultural classification to the name, based on the determined frequency distribution of the name for the at least one country, wherein evaluating the preliminary cultural classification comprises:
      upon determining that only one cultural sub-classification of the plurality of cultural sub-classifications of the preliminary cultural classification is statistically significant, refining the preliminary cultural classification by assigning the one cultural sub-classification to the name as the final cultural classification to the name;
      upon determining that more than one cultural sub-classification of the plurality of cultural sub-classifications of the preliminary cultural classification is statistically significant, corroborating the preliminary cultural classification by assigning the preliminary cultural classification as the final cultural classification for the name; and
      upon determining that none of the plurality of cultural sub-classifications of the preliminary cultural classification are statistically significant and that more than one cultural sub-classification of a second cultural classification is statistically significant, overriding the preliminary cultural classification by assigning the second cultural classification to the name as the final cultural classification for the name; and
   completing the search request by searching for the name among the plurality of names within the database based on the final cultural classification assigned to the name.

9. The computer-readable storage medium of claim 8, wherein the computer executable instructions for determining the frequency distribution of the name within a country include instructions for:
- determining a first number that represents a number of times the name appears in the country divided by a total number of names associated with the country; and
- multiplying the first number by a factor that represents a population of the country to determine a count for the name within the country.

10. The computer-readable storage medium of claim 8, wherein the computer executable instructions for receiving the search request for the name include instructions for receiving the search request through a query from a user or an application.

11. The computer-readable storage medium of claim 8, wherein the search request for a name is a search request for a personal name.

12. The computer-readable storage medium of claim 8, wherein evaluating the preliminary cultural classification further comprises:
- upon determining that none of the plurality of cultural sub-classifications of the preliminary cultural classification are statistically significant and that only one cultural sub-classification of the second cultural classification is statistically significant, rejecting the preliminary cultural classification to the name by assigning a generic cultural classification to the name as the final cultural classification for the name.

13. The computer-readable storage medium of claim 8, wherein evaluating the preliminary cultural classification further comprises:
- upon determining that no cultural sub-classification is statistically significant, rejecting the preliminary cultural classification by assigning a generic cultural classification to the name as the final cultural classification for the name.

14. The computer-readable storage medium of claim 8, wherein each cultural sub-classification is distinct relative to other cultural sub-classifications.

15. A data processing system configured to perform a search request for a name among a database including a plurality of names, the data processing system comprising:
- one or more computer processors;
- a database management system (DBMS) to receive the search request for the name; and
- one or more classification engines of the database management system (DBMS) which program the one or more computer processors to:
  - evaluate the name to assign a first cultural classification as a preliminary cultural classification to the name, wherein the first cultural classification is selected from a plurality of cultural classifications, each encompassing a respective a plurality of cultural sub-classifications;
  - determine a frequency distribution of the name for at least one country associated with at least one of the plurality of cultural sub-classifications; and
  - evaluate the preliminary cultural classification associated with the name to assign a final cultural classification to the name, based on the determined frequency distribution of the name for the at least one country, wherein evaluating the preliminary cultural classification comprises:
    - upon determining that only one cultural sub-classification of the plurality of cultural sub-classifications of the preliminary cultural classification is statistically significant, refining the preliminary cultural classification by assigning the one cultural sub-classification to the name as the final cultural classification to the name;
    - upon determining that more than one cultural sub-classification of the plurality of cultural sub-classifications of the preliminary cultural classification is statistically significant, corroborating the preliminary cultural classification by assigning the preliminary cultural classification as the final cultural classification for the name; and
    - upon determining that none of the plurality of cultural sub-classifications of the preliminary cultural classification are statistically significant and that more than one cultural sub-classification of a second cultural classification is statistically significant, overriding the preliminary cultural classification by assigning the second cultural classification to the name as the final cultural classification for the name;
  - wherein the database management system (DBMS) completes the search request by searching for the name among the plurality of names within the database based on the final cultural classification assigned to the name.

16. The data processing system of claim 15, wherein the cultural classification engine determines the frequency distribution of the name within a country by:
- determining a first number that represents a number of times the name appears in the country divided by a total number of names associated with the country; and
- multiplying the first number by a factor that represents a population of the country to determine a count for the name within the country.

17. The data processing system of claim 15, wherein the database management system (DBMS) receives the search request for the name through a query from a user or an application.

18. The data processing system of claim 15, wherein evaluating the preliminary cultural classification further comprises:
- upon determining that none of the plurality of cultural sub-classifications of the preliminary cultural classification are statistically significant and that only one cultural sub-classification of the second cultural classification is statistically significant, rejecting the preliminary cultural classification to the name by assigning a generic cultural classification to the name as the final cultural classification for the name.

19. The data processing system of claim 15, wherein evaluating the preliminary cultural classification further comprises:
- upon determining that no cultural sub-classification is statistically significant, rejecting the preliminary cultural classification by assigning a generic cultural classification to the name as the final cultural classification for the name.

20. The data processing system of claim 15, wherein each cultural sub-classification is distinct relative to other cultural sub-classifications.

* * * * *